(12) United States Patent
Brasfield

(10) Patent No.: US 11,690,470 B1
(45) Date of Patent: Jul. 4, 2023

(54) METHODS, COOKWARE, AND COOKING APPLIANCES FOR THE PREPARATION OF SMALL PORTIONS OF LASAGNA

(71) Applicant: Aubrey Cardell Brasfield, Austin, TX (US)

(72) Inventor: Aubrey Cardell Brasfield, Austin, TX (US)

( * ) Notice: Subject to any disclaimer, the term of this patent is extended or adjusted under 35 U.S.C. 154(b) by 481 days.

(21) Appl. No.: 16/831,727

(22) Filed: Mar. 26, 2020

Related U.S. Application Data

(63) Continuation of application No. 14/966,999, filed on Dec. 11, 2015, now abandoned.

(51) Int. Cl.
| | |
|---|---|
| *H05B 6/06* | (2006.01) |
| *H05B 6/12* | (2006.01) |
| *A47J 27/00* | (2006.01) |
| *H05B 6/36* | (2006.01) |

(52) U.S. Cl.
CPC ............ *A47J 27/004* (2013.01); *H05B 6/062* (2013.01); *H05B 6/12* (2013.01); *H05B 6/36* (2013.01); *A47J 2027/006* (2013.01); *H05B 2206/02* (2013.01)

(58) Field of Classification Search
CPC . H05B 6/062; H05B 6/12; H05B 6/36; H05B 2206/02; A47J 27/004; A47J 27/006; A23L 7/11
USPC ....... 219/621, 622, 624, 626, 635, 646, 662, 219/671, 672, 670; 99/426, 383, 325, 99/342; 249/115, 135, DIG. 14; 220/573.1, 573.2; 426/452, 523
See application file for complete search history.

(56) References Cited

U.S. PATENT DOCUMENTS

| | | | | |
|---|---|---|---|---|
| 3,745,290 | A | * | 7/1973 | Hamden, Jr. ........... A47J 39/00 220/574 |
| 7,201,358 | B2 | * | 4/2007 | Nichols .................. A21B 3/131 220/573.1 |
| 2005/0120891 | A1 | * | 6/2005 | Morgan .................... A21B 3/13 99/426 |
| 2009/0057318 | A1 | * | 3/2009 | Aseff ...................... A47J 36/04 220/573.1 |

\* cited by examiner

*Primary Examiner* — Quang T Van

(57) ABSTRACT

Disclosed apparatus and methods make it convenient for small portions of lasagna to be prepared conveniently and quickly. A cooking vessel and its top re described. The internal chamber of the cookware is rectangular, and its internal sidewalls are vertical. Length of the chamber is selected to accommodate layers of lasagna including a single piece of pasta. A foil container is inserted into the chamber, in which the lasagna layers are constructed, and the lasagna is cooked within the vessel and its insert. Walls of the cookware are made of ferromagnetic material such as cast iron and have a thickness that is capable of holding a significant amount of heat, which is transferred conductively to the lasagna during cooking, including pressure cooking. An induction cooking device is disclosed that does not require the cookware to be heated in a conventional oven. The device functions conjointly with the cookware.

1 Claim, 2 Drawing Sheets

To AC supply with high frequency Litz cable

METHODS, COOKWARE, AND COOKING APPLIANCES FOR THE PREPARATION OF SMALL PORTIONS OF LASAGNA

CROSS REFERENCE TO RELATED APPLICATIONS

This is a continuation of application Ser. No. 14/966,999, Filed Dec. 11, 2015, by Aubrey Cardell BRASFIELD, the entire content of which is hereby incorporated herein by reference.

BACKGROUND OF THE INVENTION

The present disclosure relates generally to the fields of cookware, cooking appliances and the preparation of food for human consumption. It rates more specifically to methods, cookware, and induction cooking appliances for the preparation of relatively small portions of lasagna, as contrasted with the baking the lasagna in a conventional lasagna pan.

Pasta refers to wheat flour, water, and possibly other ingredients combined to make a clay-like mass, which is formed into small pieces and boiled in water until cooked. It is ordinarily not cooked by baking alone. The word "pasta" is Italian for paste, and in general, the word refers to dough that is made in the Italian tradition. However, other cultures have traditions of preparing boiled grain paste, particularly Chinese traditions. To distinguish those traditions, the word noodle is often used to refer to the boiled grain paste in non-Italian traditions. A virtue of pasta is that its texture and its generally neutral flavor make it ideal for partnering with a broad range of other ingredients in pasta-containing dishes.

Different types of pastas are distinguished by their shape, as well as by the type of flour that is used, by their construction with other ingredients (such as eggs), and by the way that the dough is kneaded, left to rest, rolled out, or cut into pieces. One such pasta is lasagna (with alternate spelling lasagne), which derives its name from Latin and Greek words for "kitchen pot." There are many subtypes of lasagna, having shapes that range from square to wide noodle, and every region of Italy has its own traditional type. So-called "lasagne bastarde" refers to lasagna comprising flours that are not from wheat, particularly flour made from chestnuts [Oretta Zanini DE VITA; Maureen B Fant; Carol Field, "Lasagna" pp. 148-153 in: Encyclopedia of Pasta, Berkeley Calif.: University of California Press, 2009].

The word lasagna commonly refers not only to the pasta described above, but also to recipes or dishes that make use of that pasta in their preparation. Ordinarily, the lasagna recipe is prepared in layers, with individual layers usually corresponding to the lasagna itself; to a meat or meat-substitute in a tomato sauce, paste, or puree; and to a cheese-containing layer. There may be multiple instances of each such type of individual layer. The individual layers may have involved some separate prior cooking, or not. For example, lasagna pasta is usually boiled prior to its layering, but some lasagna pasta is intended to be placed into a layer in its dry state, such that it can imbibe liquid from adjoining layers. The lasagna recipe is baked in an oven and is then ready for consumption.

The popularity of lasagna recipes is largely due to the variety of ingredients that may be used in the layers. For example, some lasagna dishes may substitute mushrooms for a meat; may make use of cooked milk or cream in the cheese-containing layer; may incorporate almost any type of vegetable; or may leave out one of the three traditional types of layers, although if the pasta-containing layer is left out, such a "noodle-free lasagna" arguably does not deserve to be called a lasagna recipe. Many lasanga recipes are known. Exemplary recipes are found on the packages of lasagna pasta or sauce that are sold in markets, such as Quick Prep Meatball Lasagne found on a box of Market Pantry brand lasagna (Target Corp, 1000 Nicollet Mall, Minneapolis, Minn. 55403); Lasagna Al Forno on a box of Skinner brand pasta (New World Pasta, 85 Shannon Rd, Harrisburg, Pa. 17112); Barilla Lasagna found on a bottle of Barilla Sauce (Barilla, 2010 Barilla G. e R. F.lli S.p.A. P.I. 01654010345 Italy). The baking time for traditional lasagna ranges from about 30 minutes to more than an hour. Many other lasagna recipes are found in cookbooks that are devoted specifically to lasagna, or to Italian cooking more generally.

One is not inclined to go to the effort of preparing a lasagna dish to feed only one individual, and commercially available lasagna baking pans take this into account. Thus, the standard size of a lasagna baking pan is nine by thirteen inches, with a depth of more than two inches (typically 2.5 inches). This corresponds to about 8 to 10 serving portions, or 12 dietician serving portions. The issue of what size pan would be suitable for preparing lasagna if only two people were dining has been discussed, and a pan size of five by eight inches has been recommended. But a problem arises when one wants to prepare only a single-serving size of lasagna. One solution is of course to prepare the recipe in a standard lasagna baking pan, and then partition the pan into single-serving sizes, saving whatever is not initially consumed as left-over. But if a family is being served the lasagna, each member of which prefers a particular lasagna recipe, that solution does not take individual preferences into account. Thus, it would be desirable for each individual to have a single-serving size lasagna recipe (or somewhat larger size for hearty eaters), prepared according to his or her own preferred recipe.

Furthermore, it would be useful for an individual cooking for himself/herself to be able to prepare a single-serving portion of lasagna, instead of making multiple portions that would have to be eaten at different times or that would encourage over-eating at a single sitting. That individual may be a student in a dorm room, a traveler in a hotel room, a worker in the break room at his/her worksite, or some other individual who may not even have access to the oven that is needed to prepare the lasagna recipe.

Commercial establishments may also benefit from the availability of methods and apparatus that make it possible for the lasagna recipe to be prepared in single-serving sizes. For example, in a restaurant, an individual customer may want to order lasagna prepared according to a particular type of recipe, e.g., vegan lasagna as a take-out item. Unless the restaurant can anticipate the patronage of many and frequent customers with the same lasagna preferences, the restaurant may be disinclined to put lasagna recipes on its menu or would have to limit the range of lasagna recipes on its menu.

Similarly, even if a convenience store or the like wants to make available freshly prepared single-portion lasagna to its customers, it would be disinclined to do so because of the expense of installing an oven.

Furthermore, in such commercial establishments, the time required to actually prepare and bake a lasagna dish may exceed the time that the customer is willing to wait after placing an order.

The present invention addresses the foregoing limitations on the preparation of small serving-size lasagna dishes by disclosing novel cookware, cooking appliances, and methods for doing so. In some embodiments the disclosed cookware is intended to be used in a conventional oven, but in other embodiments, a novel induction oven is used, in which food within the disclosed lasagna cookware is cooked rapidly and evenly, entirely within the confines of the coil of the induction cooker.

BRIEF SUMMARY OF THE INVENTION

Disclosed cookware, induction cooking appliances, and methods of cooking make it convenient for relatively small portions of lasagna to be prepared conveniently and quickly. A cooking vessel and its top are disclosed for the cooking of lasagna specifically. The internal chamber of vessel is rectangular on all sides when closed by its top, and the sidewalls of the vessel are vertical. The length of the chamber is selected to accommodate layers of lasagna, each of which comprises a single piece of such pasta. A foil container is ordinarily inserted into the chamber of the vessel, in which the lasagna layers are constructed, and the lasagna is cooked within the vessel and its insert. The walls of the vessel and its top are preferably made of cast iron and have a thickness that is designed to be capable of holding a significant amount of heat, as follows.

By way of example, the vessel and its top are preheated to a temperature of 400 F, and a refrigerated (36 F) foil container containing a layered lasagna preparation is placed within the vessel chamber and covered with its top. Even before the vessel is placed back into an oven, heat is transferred from the vessel and its top to the lasagna, such that the temperature of the lasagna may rise to above 212 F (100 C). Thus, the vessel and its top are configured to be able to act as a pressure cooker, even before the vessel is placed back into an oven. Once the cooking of lasagna is finished, the top of the vessel is removed, the foil insert containing the lasagna is removed from the vessel, and the foil insert is placed within a thermally insulating container that may be provided as a take-out item at a restaurant.

An induction cooking device is disclosed that does not require the vessel and its top to be heated in a conventional oven. The induction cooking device is used conjointly with the disclosed cookware, namely, cookware that is ferromagnetic and that is generally long and narrow. The cooking vessel and its top (containing the lasagna to be cooked) are placed within the lumen of an induction heating coil.

When alternating current is passed through the coil, induced currents such as eddy currents, as well as hysteresis heating, causes the cooking vessel to heat quickly, which subsequently cooks the lasagna by conductive heating. The induction cooking device is preferably programmable so that the cook can select an appropriate cooking temperature as a function of time within the cooking vessel and within the food that is contained within the vessel. A pressure sensor and regulator may also be used to control the cooking pressure and temperature as a function of time.

INCORPORATION BY REFERENCE

Hereby, all issued patents, published patent applications, and non-patent publications that are mentioned in this specification are herein incorporated by reference in their entirety for all purposes, to the same extent as if each individual issued patent, published patent application, or non-patent publication were specifically and individually indicated to be incorporated by reference.

DETAILED DESCRIPTION OF THE PREFERRED EMBODIMENTS

Figure 1:
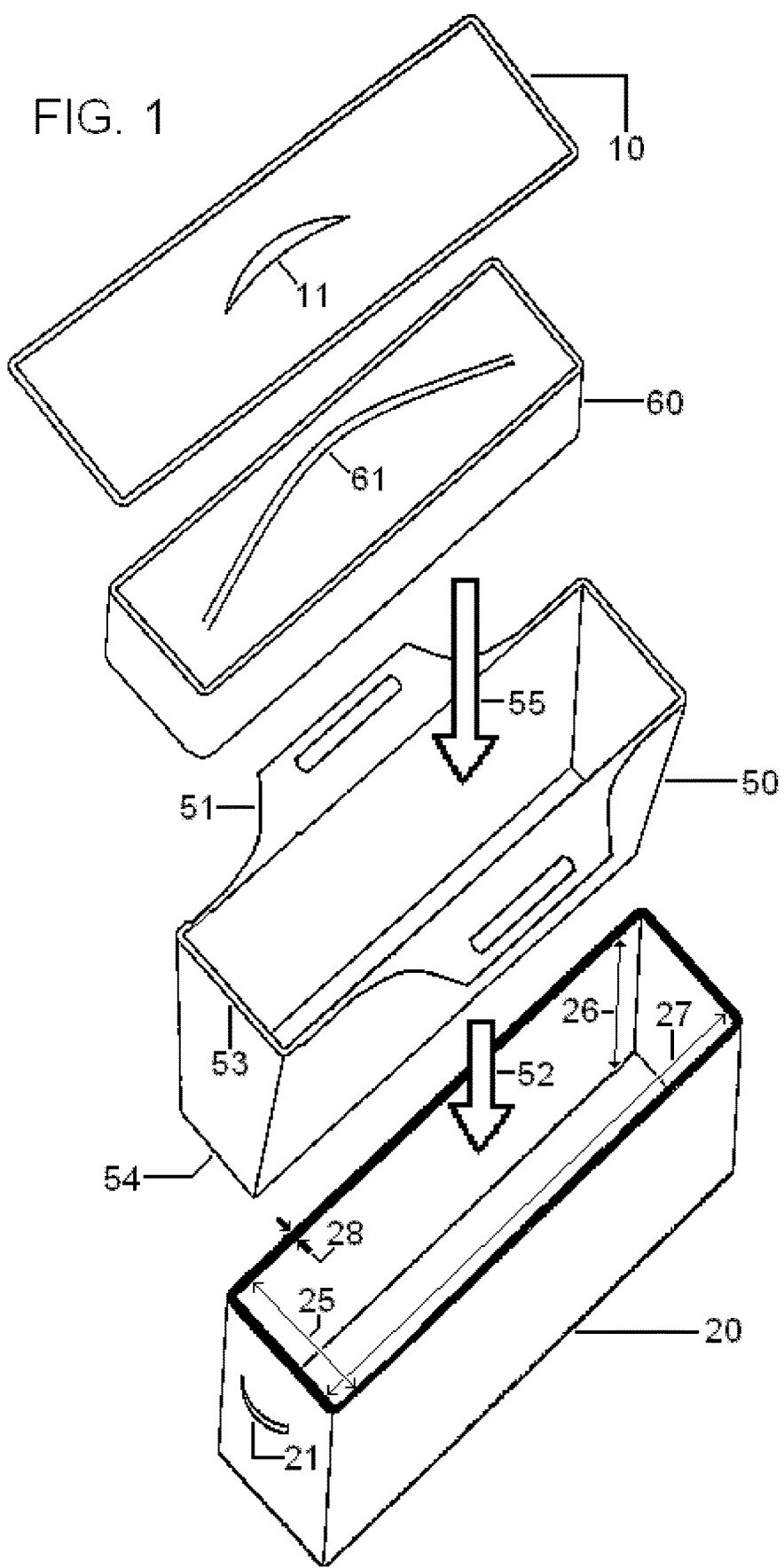
FIG. 1 illustrates components of the invention in a preferred embodiment, comprising a cooking vessel and its top, a foil insert, and a press that is used to make the foil insert conform to the internal dimensions of the cooking vessel.
Figure 2:
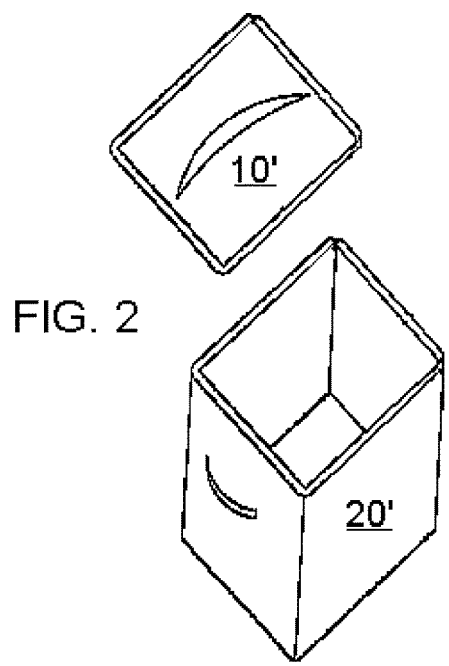
FIG. 2 illustrates a cooking vessel and its top that have a shorter length than the one shown in FIG. 1, making the vessel suitable for cooking a single-size portion of lasagna.

FIG. 1 illustrates an embodiment of the cooking vessel 20 that is used to cook lasagna. It is rectangular with a top 10, and the sidewalls of the vessel 20 are vertical. The chamber or inner space within which the lasagna is cooked is shown in FIG. 1 to have dimensions with a width 25 in the range of 3 to 4 inches (7.62 to 10.16 cm), a height 26 in the range of 3 to 4 inches (7.62 to 10.16 cm) and a length 27 in the range of 12 to 14 inches (30.48 to 33.56 cm). However, other dimensions are also envisaged, particularly by shortening the length 27, e.g., from 12 to 13 inches to about 3 to 4 inches (7.62 to 10.16 cm), as shown for the vessel 20' and top 10' in FIG. 2. The latter dimensions are most suitable for the preparation of single-serving recipes. The vessel 20 may have insulated handles 21 to facilitate movement of the vessel, and the top 10 may also have a handle 11 to facilitate its movement, especially when they are hot.

The top 10 of the vessel 20 may be attached to the vessel 20 by its weight alone, or its attachment may be guided by pegs or bars that are attached to either the top 10 or vessel 20, with the pegs or bars inserted into a corresponding joint hole or groove in the opposing item. Alternatively, a more secure attachment may be achieved by sliding the top 10 over the vessel 20, using the type of sliding mechanism that is used in Pullman pans and some cake-pan lids. Any other attachment method may also be used, such as using clamps or other types of fasteners. In the event that the pressure within the vessel will become high, something like the peg/joint-hole method is preferred because it will allow internally-produced steam to lift the top for venting.

For reasons that are discussed below, the cooking vessel 20 and its top 10 are preferably made of cast iron, and the wall and top thickness 28 is from 0.5 to 1 inch (1.27 to 2.54 cm). Preferably, all of the walls of the vessel 20 and top 10 have the same thickness 28, but it is also envisaged that each wall and the top might have a unique thickness. Furthermore, although the outer surface of the vessel 20 together with its overlaid top 10 is preferably rectangular along all axes, this is not critical, and some external curvature would be permitted, for example, to facilitate introduction of the vessel 20 and its overlaid top 10 into the lumen of an induction coil, as described below.

The internal dimensions of the vessel 20 shown in FIG. 1 are chosen according to the size of lasagna that is selected from food markets. The length 27 of the opening to the vessel corresponds to the size of a single piece of lasagna pasta that would be placed into the vessel in order to make one of the lasagna layers. The reason that the sidewalls of the vessel must be vertical is that a uniform lasagna width is desired. If the vessel were slanted (non-vertical) so that similar vessels may stacked within one another for storage, then either a piece of lasagna pasta that was layered at the top of the finished lasagna recipe would not completely fill the contents of the vessel to the edge, or the piece of lasagna in the bottom layer would overfill the vessel.

Otherwise, to fill the vessel 20 the cook would have to cut or break pieces of lasagna pasta to make layers that completely fill the vessel, which would be a nuisance.

The lasagna pasta will ordinarily be boiled before being placed into the layers of the lasagna recipe, although use of pasta designed to be layered in the dry state is also envisaged. For the latter type of pasta, the pasta would absorb fluid from adjoining layers during cooking. In any case, the pasta may swell by a factor of 1.6 to 1.8 (by weight) as it absorbs liquid during boiling or cooking, and this must be taken into account [Harold McGEE. Pasta, Noodles, and Dumplings. pp. 571-579 In: On Food and Cooking. New York: Scribner, 1984].

By way of example, I measured the following lasagna dimensions as a function of boiling time, for the three commercially available brands of pasta that were mentioned above, respectively. Evidently, there is considerable variation from one pasta source to another. Consequently, the pasta source, boil time and the size of the vessel shown in FIG. 1 must be selected to correspond to one another during the preparation of the recipe. Another consideration in this regard is that the lasagna pasta that is ultimately prepared should have the texture and taste that is desired.

| | Lasagna No. 1 | | Lasagna No. 2 | | Lasagna No.3 | |
|---|---|---|---|---|---|---|
| boil time | length (in.) | width (in.) | length (in.) | width (in.) | length (in.) | width (in.) |
| 0 min. | 9.63 | 2.20 | 10.00 | 2.25 | 9.88 | 2.20 |
| 5 min. | 9.88 | 2.38 | 10.13 | 2.31 | 10.38 | 2.20 |
| 10 min. | 10.88 | 2.75 | 11.75 | 2.75 | 11.75 | 2.38 |
| 15 min. | 11.88 | 3.00 | 12.56 | 2.75 | 12.75 | 3.00 |
| 20 min. | 12.56 | 3.25 | 13.44 | 3.20 | 13.25 | 3.20 |

The shape of the vessel 20 with top 10 that is shown in FIG. 1 is most similar to a loaf pan. Almost all commercially available loaf pans are stackable, which means that the sidewalls are not vertical, and they therefore do not satisfy the shape requirements of the vessel 20 disclosed here. An exception is a class of pan known as a Pullman pan (pain de mie pan), which is used to make square and virtually crustless bread, having dimensions of 4×4 inches when sliced. Bread baked in such pans was served by the Pullman Palace Car Company beginning about 1868, although the baking of square crustless bread is said to have a long history [Elizabeth DAVID. English Bread and Yeast Cookery, pp. 206-209. Middlesex UK: Penguin, 1979]. However, I have been unable to find any Pullman pan that has the size and shape that is required for use as described here and that also has thick cast iron walls. Baguette pans (French bread in the USA, Vienna bread in France) are also long and slender, but they are not rectangular and are not closed, so they too do not satisfy the shape requirements of the cooking vessel disclosed here. Some terrine pans are also long and slender. Terrine pans are traditionally used to compact a forcemeat mixture like pate. Terrine cookware is traditionally made of earthenware, but some modern versions are made of enameled cast iron. However, I have been unable to find any terrine cookware that has the size and shape that is required for use as described here and that also has thick cast iron walls. Consequently, the cooking vessel shown in FIGS. 1 and 2 appears to be novel, which would be attributable to the novelty of its usage that is also disclosed here.

As mentioned above, it is intended to be able to transfer the cooked lasagna conveniently for serving, e.g., as a take-out item at a restaurant. Therefore, it is envisaged that a foil container may be inserted into the chamber of a cooking vessel 20 like what is shown in FIG. 1, so that the lasagna is cooked within the foil insert, and the foil insert is ultimately removed from the cooking vessel for before serving. Such a foil insert 50 is shown in FIG. 1, with foil handles 51 to facilitate its movement. Foil inserts of the type shown in FIG. 1 are commercially available, but all of them are stackable. Thus, the top width 53 and bottom width 54 of the stackable foil insert are different, so that one foil insert may be placed in another. In order for the cooking vessel to transfer heat efficiently to the foil insert, they must be firmly and securely contiguous to one another. However, when a stackable foil insert 50 is preliminarily inserted as indicated by 52 into the chamber of the vessel 20 with vertical walls, the insert does not fit perfectly. Consequently, the invention envisages the use of a press tool 60 that is inserted into the foil insert as shown by 55, which forces the walls of the foil insert 50 to develop vertical walls that are contiguous with the walls of the vessel 20 that is acting as a mold. Once the foil insert is well-formed by the press 60, the press is removed using its handle 61. The foil insert has another use, in addition to serving as a removable container for the cooked lasagna, as follows. It is well known that cast iron cookware may need to be seasoned if the cooked food is in direct contact with the iron, but if a foil insert is used, the need to season the cast iron is minimized [Harold McGEE. Cooking Methods and Utensil Materials. Chapter 14, pp. 777-791 In: On Food and Cooking. New York: Scribner, 1984].

The well-fitted foil insert 50 may be removed from the chamber using its foil handles 51, and the lasagna may then be layered into the foil-insert. Afterwards, the lasagna in the foil 50 is inserted back into the cooking vessel 20 for cooking. Alternatively, layering of the lasagna may occur in the foil insert 50 even while the foil is situated in the vessel 20. In either case, the lasagna should completely fill or slightly over-fill the chamber. A sheet of foil is then placed over the lasagna, and the sheet is crimped to the edges of the foil insert. The foil handles for the insert are then folded over the foil sheet, and the top 10 of the vessel 20 is placed onto (or attached to) the vessel itself for cooking. When the cooking is finished, the top 10 is removed using its handle 11, and the foil insert 50 containing the cooked lasagna is removed for consumption using its handles 51. For use as a take-out item, the foil insert 50 may then be placed into an insulated box into which it fits, and the box is covered by its own insulated lid. Because the lasagna is hot at this point, it will continue to cook in its own juices until it is eaten, and the consumer will be expected to wait a brief period to let the lasagna finish cooking and cool.

If the cooking vessel 20 with its top 10 is heated in a conventional baking oven, the thickness 28 of the wall of the baking vessel, as well as the vessel's and top's heat capacity, are significant factors in the functioning of the disclosed vessel 20 shown in FIG. 1. The vessel may be pre-heated in the oven, and the vessel may then be removed from the oven, in order to re-insert the pressed and removed foil-insert in which the lasagna has been layered. A significant amount of cooking of the lasagna may take place within the vessel, even without the closed-vessel-with-foil-insert being placed back into the oven. In the conventional baking of lasagna, the baking relies on a combination of radiation from the walls of the oven and hot-air convection, in order to heat the food. But because neither radiation nor air convection transfers heat efficiently to the food, the present invention will deliver heat to the food far more quickly than baking, via conduction of heat from the walls of the vessel 20 and its top 10, like the one shown in FIG. 1 (and through the aluminum of the foil, when such a foil insert is being used). Consider the following example, which pertains to cooking a single-person size portion of lasagna.

In this example, the vessel's inner dimensions are 3.5× 3.5×3.5 inches (8.89×8.89×8.89 cm), and the thickness of the walls of the cast iron vessel are one inch each. The top or lid that covers the vessel is also assumed to have a thickness of one inch (2.54 cm). The lasagna is assumed to be prepared already in the foil container, covered with its own foil sheet, and it is being stored in a refrigerator with temperature 36 F (2 C) prior to its cooking. The cast iron vessel 20 and its top 10 are pre-heated in an oven that is set to a temperature of 400 F (204.4 C). The vessel 20 with top 10 is then removed from the oven, and the foil insert with its lasagna is then placed within the chamber of the vessel, and the vessel's top is placed on the vessel. The pre-heated vessel at 400° F. will then conduct heat to the lasagna at 36° F., such that the vessel will cool and the lasagna will heat, and they would eventually reach the same temperature if they remain out of the oven and are covered by some insulating cloth. That ultimate temperature may be calculated to be approximately 274° F. (134.6 C). To perform the calculation, one preliminarily estimates the heat capacity of lasagna based on its percentage of water, carbohydrate, protein, fat, and ash (available from the "Nutrition Facts" label of store-bought lasagna) and the contribution of those substances to its heat capacity [Mohammad Shafuir RAHMAN and Jasim Ahmed. Handbook of Food Process Design, page 61. Hoboken: John Wiley & Sons, 2012]. The heat capacity of lasagna according to this estimate is 3.44 J/gm/degree K. The calculation of ultimate temperature is then based on the fact that the heat gained in the lasagna equals the heat lost from the vessel, which requires knowledge of the dimensions of the vessel, as well as the known density and heat capacity of cast iron and lasagna. If steam is allowed to vent from the vessel, and the amount of that vented steam is known, then a correction for the corresponding latent heat of vaporization can be made to the calculation. For example, if the venting occurs with a pop-up top that allows only 15 pounds per square inch (the maximum pressure allowed by most conventional pressure cookers), the lasagna inside the vessel is being subjected to an ultimate temperature of about 250 to 257° F.

The foregoing example demonstrates that the temperature of the cooked lasagna may significantly exceed that corresponding to the boiling point of water at atmospheric pressure, even before the vessel is placed back in the oven for additional cooking. Consequently, unless the vessel is given a way to vent the steam that is produced during cooking, the vessel will act also as a pressure cooker, thereby speeding the cooking of the lasagna contained within it. The weight of the vessel's top may prevent the easy escape of steam, but unless the top 10 is clamped or otherwise affixed onto the vessel 20, some steam may leak around the edges of the top to prevent the formation of excessive pressure. If the top of the vessel is configured to attach to the vessel using a peg and joint-hole arrangement, then such an arrangement would function as a pop-up pressure release mechanism. In that case, the limiting pressure within the vessel equals the weight of the top of the vessel divided by the surface area of the top that is in contact with steam from the cooking chamber (i.e., force per unit area). By selecting among different weights of tops, the cook may thereby select the ultimate cooking pressure. Alternatively, a separate ordinary pressure cooking valve may be added to the top 10, selected according to the maximum pressure that is desired.

In any event, rapid heating by conduction through the pre-warmed vessel and its top, plus some intentional pressure cooking, causes the cooking of the lasagna to take place significantly faster than would be the case in a conventional oven using conventional cookware.

In some embodiments of the present invention, the cookware should be made of a material that allows the cookware to be heated by an induction heating coil, e.g., made of a ferromagnetic material such as cast iron. Unlike the induction cooking appliances that have been used heretofore, in the present invention the cooking vessel is placed within the lumen of an induction coil, rather than on top of the coil. Descriptions of stove-top induction cooking are found in W. C. MORELAND. The Induction Range: Its Performance and Its Development Problems, IEEE Transactions on Industry Applications, vol. TA-9, no. 1, January/February 1973, pages 81-86. There are also many examples of stove-top induction cookers in the patent literature. For example, in U.S. Pat. No. 9,066,374, entitled Induction-based food holding/warming system and method, to Graber et al., a pancake-shaped induction heating coil is used to keep food warm in a pan above it.

The above-cited publications about induction cooking do not involve placing cookware or food within the lumen of an induction coil, so their methods are significantly different than what is disclosed here. Canned food has been placed within the lumens of induction coils for heating, but apparently non-sealed, stationary, vent-able cookware has never been heated within the lumen of an induction coil. In fact, it is the long and narrow aspect of the presently disclosed cooking vessel 20, conceived here to be well-suited for induction cooking within a correspondingly long and narrow solenoid-shaped coil's lumen, that is apparently novel. For comparison, pending patent application U.S. Ser. No. 13/832,573 with publication US20140263286, entitled Induction heating system for food containers and method, to Widitora et al., is concerned with the sterilization or cooking of sealed cans of food that are moving along a conveyor belt in an industrial plant. In application JP2010-284350 with publication JP2012130275, entitled Electromagnetic induction heating type food baking machine, the cooking of dough-filled baking molds that are moving inside a bakery tunnel is described. In U.S. Pat. No. 7,432,479, entitled Method and apparatus for induction heating of a food container, to A vendano et al, induction is used to heat food that is dispensed from a vending machine. The device heats to serving temperature sealed packages or sealed cans of pre-cooked food or drink. None of those examples disclose non-sealed (e.g., ventable), stationary cookware that may act as a pressure cooker, that is also designed conjointly to be heated within the lumen of an induction coil.

Figure 3:
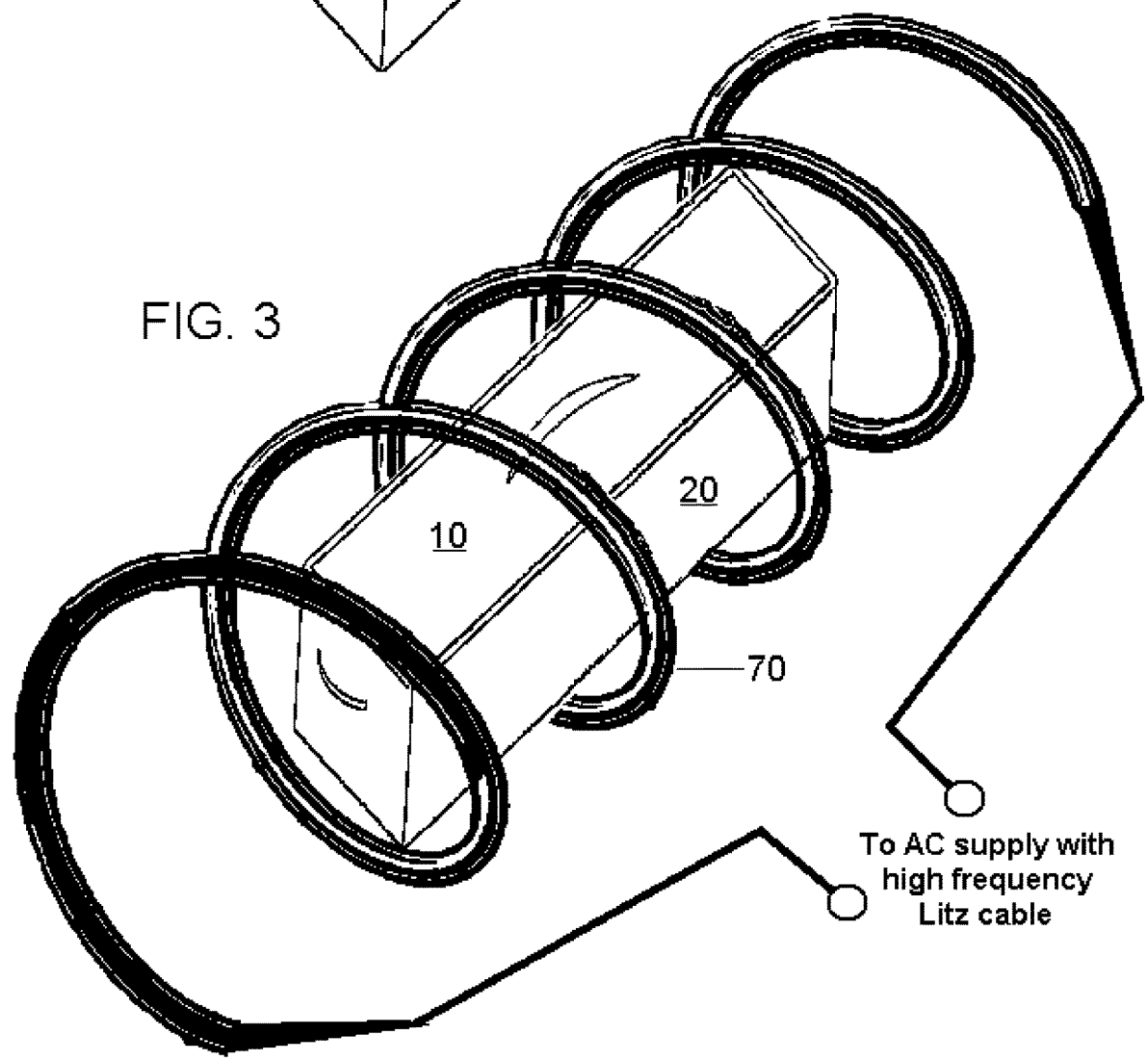
FIG. 3 illustrates heating of the cooking vessel and its top from FIG. 1 (containing a food such as lasagna), within the lumen of an induction heating coil.

To perform the induction cooking, alternating electrical current is passed through the coil, and heat is generated in the cookware vessel via the magnetic field that is produced by the coil. That magnetic field extends into the cookware to induce electrical current in the cookware, which then produces resistive (joule) heat that flows throughout the cookware by thermal conduction. Heat may also be generated by magnetic hysteresis losses. The configuration is illustrated in FIG. 3, where 20 and 10 refer to the vessel and its top, respectively, that were shown in FIG. 1 (closed and containing the lasagna that is being heated), and 70 shows the induction coil that enclosed the vessel and top within its lumen. The magnitude of the heating depends upon the frequency of the alternating current. At relatively low frequencies, the induction may occur throughout the wall of the cookware, but at higher frequencies, the induction primarily causes eddy currents that occur near the surfaces of the cookware [LUCIA, Oscar; Maussion, Pascal; Dede, Enrique and Burdio, Jose M. Induction Heating Technology and Its Applications: Past Developments, Current Technology, and Future Challenges. IEEE Transactions on Industrial Electronics 61 (5, 2013): 2509-2520].

As indicated above, the preferred cast iron cookware is a suitable for such use (i.e., a iron-carbon alloy with a carbon content greater than 2%). However, some other alloys of iron may not themselves be suitable for such induction heating. If a magnet sticks well to the metal cookware, it should work.

Other types of cookware, including aluminum, are only suitable if a special design of induction heater is used at particular frequencies, and they are quite inefficient [TANAKA, T. A new induction cooking range for heating any kind of metal vessels. IEEE Transactions on Consumer Electronics 35(3, 1989):635-641].

The coils of the induction heater may be made of brass tubing, litz wire, or the like. There may be one coil or multiple coils that define the lumen into which the cooking vessel is inserted. The closer the looping of the coil(s), the more uniform will be the magnetic field that is produced within it, leading to more uniform induction heating within the lumen of the coil. Thus, the preferred coil winding may be considerably more tight than what is shown in FIG. 3 and may involve winding wire around an insulating cylinder. The energy density of the magnetic field depends on the strength of the field, squared, and also upon the magnetic permeability of the material it fills. Iron has a much larger permeability than a vacuum, air, and water, so the energy and lines of magnetic flux will be concentrated in the iron. Note that because all of the walls of the cooking vessel are being inductively heated simultaneously, the design that is disclosed here significantly reduces the possibility of non-uniform cooking and hotspots.

Optionally, one may make the two end-walls (which are the walls positioned at the front and back of the coil's lumen) from a thermally insulating material that has a smaller magnetic permeability than iron. With such end-walls, the magnetic field and heat will be concentrated away from the end-walls, so the cooking will occur from side to side, but not as much from end to end, within the vessel 20 and its top 10. More generally, the invention envisages that the structure of the cookware may have variable and even irregular wall thickness, that the amount of ferromagnetic material may vary throughout the walls of the cookware, and that the thermal conductivity of the cookware material may likewise vary throughout the walls of the cookware. Furthermore, an insert need not be made of aluminum foil, but may instead be made of a ferromagnetic material and may function as a skewer that is inserted into the food so as to bring induction heating to the center of the cavity of the cookware, rather than rely on the conduction of heat from the sidewalls. Thus, if the food has parts that need different amounts of heat, or time of heating, to be cooked thoroughly, the invention envisages the ability to individualize the cooking of each part of the food, by arranging the structure of the cookware and its insert accordingly. Rather than settle for optimizing the cooking of the food by cooking in such a way that each part of the food is cooked as well as it can be, without incurring poor cooking in other parts of the food, an objective of cookware according to the present invention is to generate whatever heat is best for cooking each part of the food individually. In fact, whereas conventional heating occurs from the outside to the inside of a food, the present invention envisages also that heating can occur from the inside to the outside of a food, as follows. The pointed end of an insert is made of a ferromagnetic material and is inserted into the food, but the remaining part of the insert is made from either a thermally nonconductive material or a metal that is not ferromagnetic, and the vessel and top are likewise made from either a thermally nonconductive material or a metal that is not ferromagnetic. In that case, the pointed end of the insert generates the heat via induction heating, and that heat flows from the inside of the vessel outwards.

Illustrative electronics for an induction coil that may be used for the invention is found at the web page entitled "A DIY Induction Heater" from RMcybernetics (RMCybernetics LTD, 69b Crewe Road, Alsagerm, Cheshire, ST7 2EZ, United Kingdom). In a preferred embodiment, the system's induction heater will use feedback or feedforward to control heating of the cast iron cooking vessel. For example, infrared temperature sensors or some other type of thermometer (e.g., thermocouple, thermistor, silicon band gap temperature sensor, resistance temperature detector or other such sensor known in the art) may sense the temperature at one or more location on the vessel, or even on the surface of the food using, for example, high temperature optical fiber that passes infrared light from the food, and the power directed to the vessel is automatically adjusted so as to achieve a pre-selected time/temperature response. In a preferred embodiment, the device may also contain pressure sensors that sense the pressure within the chamber of the device, and the system's induction heater may also use feedback or feedforward to control heating of the cast iron cooking vessel so as to achieve a pre-selected time/temperature/pressure response.

In the simplest control design, the power is shut off automatically if the temperature is greater than some selected value, and with more complicated designs the power is adjusted continuously. With the latter control designs, programmed cooking time-temperature-pressure prescriptions may be used to cook the lasagna with far more control and specificity than in a conventional oven. Through experimentation with the time-temperature-pressure prescription and with the lasagna recipe itself, it should then be able to optimize any particular lasagna recipe for taste, texture, and cooking time. It is also understood that such cookware, cooking appliances, and methods may be used to prepare food other than lasagna.

The induction cooker is preferably housed in a box that resembles a microwave oven, to the extent that its user opens a door and places the cooking vessel into a chamber that is designed to accept it. The user selects the cooking program using selection buttons on the face of the unit. The chamber of the induction cooker will correspond to a lumen of the induction coil(s) that are described above and that are illustrated in FIG. 3. A fan will ordinarily be used to cool the coils themselves as they heat up, or if extremely high currents are needed in order to achieve very rapid cooking, the coils may be made of metal tubing, with cooling water passed through the tubing, allowing coil heat to be dissipated through heating fins and the like, at a site distant from the coils themselves.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for cooking a hydrated flat wide pasta strip, said method done by preparing a batter mix of flour, eggs, carbonated water, meat bits, cheese bits comprising:
   a) covering the bottom of a disposable container with olive oil;
   b) dipping a first hydrated flat wide pasta strip in said batter mix;
   c) frying said first hydrated flat wide pasta strip;
   d) placing said first fried hydrated flat wide strip noodle within 3 mm closing from its four sides of said disposable container;
   e) dipping a second hydrated flat wide pasta strip in said batter mix;
   f) frying said second hydrated flat wide pasta strip;
   g) stacking said second fried hydrated flat wide strip noodle, superimposed on said first fried hydrated flat wide strip noodle, within 3 mm closing from its four sides of said disposable container;
   h) dipping a third hydrated flat wide pasta strip in said batter mix;
   i) frying said third hydrated flat wide pasta strip;
   j) stacking said third fried hydrated flat wide strip noodle, superimposed on said second fried hydrated flat wide strip noodle, within 3 mm closing from its four sides of said disposable container;
   k) pouring a tomato sauce in said disposal container;
   l) placing a vessel in an induction oven, wherein said vessel is made of cast iron or ferromagnetic material;
   m) preheating said induction oven to 230 degrees Celsius;
   n) removing said vessel from said induction oven after said preheating step m);
   o) placing said disposable container in said vessel;
   p) placing said vessel in said induction oven after the placing step o);
   q) cooking said vessel for 2 minutes;
   r) removing said vessel from said induction oven;
   s) removing said disposable container from said vessel;
   t) placing said disposable container in a box.

* * * * *